United States Patent [19]

Telldén

[11] Patent Number: 4,636,134

[45] Date of Patent: Jan. 13, 1987

[54] ARRANGEMENT IN AN INDUSTRIAL ROBOT

[75] Inventor: Leif Telldén, Västerås, Sweden

[73] Assignee: ASEA AB, Västerås, Sweden

[21] Appl. No.: 732,722

[22] Filed: May 10, 1985

[30] Foreign Application Priority Data

May 18, 1984 [SE] Sweden ............................... 8402689

[51] Int. Cl.$^4$ ............................................. B25J 1/00
[52] U.S. Cl. ...................................... 414/729; 901/17; 901/28; 901/26
[58] Field of Search ....................... 901/27, 28, 29, 17, 901/18, 19, 23, 24; 414/729; 384/519, 517, 563; 74/395, 423, 417

[56] References Cited

U.S. PATENT DOCUMENTS

| | | | |
|---|---|---|---|
| 3,212,649 | 10/1965 | Johnson et al. | 901/17 X |
| 3,948,093 | 4/1976 | Folchi et al. | 901/29 X |
| 4,149,429 | 4/1979 | Pfenning | 74/417 |
| 4,173,376 | 11/1979 | Standing et al. | 384/519 X |
| 4,226,485 | 10/1980 | Pruvot | 384/563 X |
| 4,311,556 | 1/1982 | Iwamoto et al. | 901/17 X |
| 4,502,830 | 3/1985 | Inaba et al. | 901/29 X |
| 4,531,847 | 7/1985 | F'Geppert | 384/519 |

FOREIGN PATENT DOCUMENTS 53-52776 4/1978 Japan .

OTHER PUBLICATIONS

International Search Report

*Primary Examiner*—Robert J. Spar
*Assistant Examiner*—D. Glenn Dayoan
*Attorney, Agent, or Firm*—Watson, Cole, Grindle & Watson

[57] ABSTRACT

An arrangement in an industrial robot for driving translatory motion of a unit which is mounted in a gimbal-type suspension having two mutually perpendicular axes. A motor with associated resolver is mounted in the pivotable frame of the gimbal-type suspension, the frame being capable of being swung in one direction. The motor drives a pinion which meshes with a rack by a shaft, the shaft also constituting one journal of the machine part in which the translatorily movable machine part is movably arranged. The shaft is rotatably journalled to both the frame and the machine part through each of its bearings.

3 Claims, 4 Drawing Figures

ARRANGEMENT IN AN INDUSTRIAL ROBOT

Applications disclosing subject matter of interest to the subject matter of the subject application are U.S. Ser. No. 732,650 to Skoog et al., filed May 10, 1985 and U.S. Ser. No. 770,272 to Allared, filed Aug. 28, 1985, both assigned to the same assignee as the subject application.

The present invention relates to an arrangement in an industrial robot of the kind having two mutually perpendicular swinging axes arranged in accordance with the gimbal-ring type principle, including a frame which is swingably mounted via trunnions or journal means on a respective side of a carrier device, to enable a first swinging movement about a first swinging axis, wherewith a machine part is in turn journalled in trunnions or journal means in the frame for swinging motion about a second swinging axis extending at right angles to the first swinging axis, and which machine part in turn accommodates a unit which is translatorily movable at right angles in relation to the second swinging axis, which unit in turn carries a working device, optionally through the intermediary of further movable devices which create degrees of freedom, there being provided a motor for each said movement, and which arrangement is intended to transfer power from a motor to a translatory drive mechanism for movement of the translatorily movable unit in the gimbal-ring type movable machine part.

By gimbal-ring type principle is meant here the age old mounting principle by which a unit can be swung about two mutually perpendicular axes; a typical example hereof is the compass suspension of a ship's compass, in which a frame or ring is journalled on opposing journal means and in turn carries two journal means located at right angles to the first mentioned journal means. This principle has also been employed to afford mobility to industrial robots.

An example of this kind of industrial robot, in which the gimbal-ring type or universal suspension carries a part arranged for translatory movement in a direction at right angles to the second rotational axis, seen from without and inwardly, is disclosed in Japanese Patent Application No. 53-52776.

For each movement, also called degree of freedom, there is provided a separate drive motor, and as a rule, some form of level sensor, with which it is possible to achieve controlled motion. The present invention is directed to an arrangement for producing the driving force for the third movement or degree of freedom, as seen from without and inwardly, namely the translatory movement.

It is a general desire to place the motors "as far out as possible" in the construction, preferably adjacent the immovable mounting or like means of the robot, and to transfer the driving force to the movable elements through the intermediary of transmission means. In the subject of the aforesaid Japanese patent application, the three motors are thus firmly located on the carrier device and do not therefore accompany the three mutually nestled movements. In order to achieve this there is used a series of gears, where a gear for each freedom of movement in the system is mounted on one of the journal means which carry the first frame in the carrier arrangement. The two power transmission means which drive motion inwardly of the frame are therewith freely running or idling and engage a respective gear mounted on the frame and on a respective shaft, these shafts being provided with worm screws. The one worm screws meshes with a worm wheel sector which effects the second swinging movement at right angles to the first, while the other worm screw meshes with a worm wheel which idles on one of the journal means for the second swinging movement and is connected with a bevel gear which also idles or runs freely on the same shaft. This bevel gear meshes in turn with another bevel gear, the rotary axis of which is at right angles to the journal means just mentioned and coincides with the direction of said translatory movement. This latter bevel gear has a concentric internal screw-thread and is screwed onto a screw-threaded rod, which is prevented from rotating. Consequently, when this latter bevel gear, which functions as a nut, rotates, the screw-threaded rod effects the intended translatory movement.

This known construction in fact achieves the object of enabling the translation motor to be placed near the carrier arrangement. However, the construction incorporates the use of at least five conventional gear meshes and one worm gear mesh, and irrespective of how accurately the construction is made, the total play will be significant and also difficult to eliminate by adjustment. This contributes towards an insufficiency in the precision of the robot. Furthermore, the use of worm gears results in poor efficiency when compared with gears having a rolling action.

An object of the invention is to provide simplified power transmission to the aforesaid translatory motion which, in addition, also enables a reduction in the possibilities of accumulating play, particularly by reducing the number of gear meshes. This is achieved in accordance with the invention by an arrangement in industrial robots of the kind mentioned in the introduction, in which the motor is mounted on the aforesaid swingably journalled frame and connected to one of the two trunnions or journal means in which the machine part is journalled; and in which arrangement said trunnion or journal means is rotatably journalled to both the frame and the machine part and is provided at said machine part with a pinion which is rotated by the motor and which meshes with a rack associated with the translatory movable unit of the machine part and extends parallel with the direction of movement thereof.

In order to render the arrangement less space consuming, the motor shaft or axis suitably forms an angle with the driven journal means and a bevel gear is mounted therebetween. This enables the number of gear meshes to be reduced to two. With suitable gear forms, e.g. evolute gears, play can also be reduced to a minimum, with regard to the bevel gear with the aid of shims for example, and with regard to the pinion-rack mesh by mutual displacement. In this regard, in accordance with one preferred embodiment the journal means in the swingable machine part has an eccentric bearing ring so that the distance can be adjusted by rotating the ring.

An angle resolver is suitably mounted between the motor and the pinion, to provide controlled motion. In such case, the resolver is preferably mounted between the motor and the bevel gear, optionally with an elastic coupling located between the motor and the resolver.

It should be noted that the second swinging movement is slightly coupled to the translatory movement, since swinging of the machine part about the second swinging axis when the motor driven journal means is stationary, will cause the pinion to rotate relative to the machine part and therewith relative to the rack, and hence such swinging motion will also result in small simultaneous translatory movements. This weak coupling, however, can be readily compensated for, by allowing the motor to rotate the pinion to a corresponding extent. Since an industrial robot of the type intended here is normally controlled by a data processor, the necessary compensation can be readily effected through programming measures. The magnitude of the compensation required is, of course, directly proportional to the angle through which the swing is made.

Although the invention relates solely to the arrangement of one single motion in an industrial robot having many freedoms of movement, it is of worth to note that the described movements including two mutually perpendicular swinging movements and a translatory movement enable a point on the translatorily movable unit to be placed on any selected point within three-dimensional space coinciding with the span. Further degrees of freedom can then be embodied at this point, by introducing rotating and/or swinging mechanisms, gripping devices etc., which may be of a kind known per se. The invention provides a rigid and useful carrier for such devices or other tools etc., e.g. of the kind already widely used within different industries. For example, a very high percentage of all welding work effected in the manufacture of vehicle bodies is performed today with the aid of different types of welding robot.

The invention will now be described with reference to a non-limiting embodiment thereof illustrated in the drawings.

Figure 1:
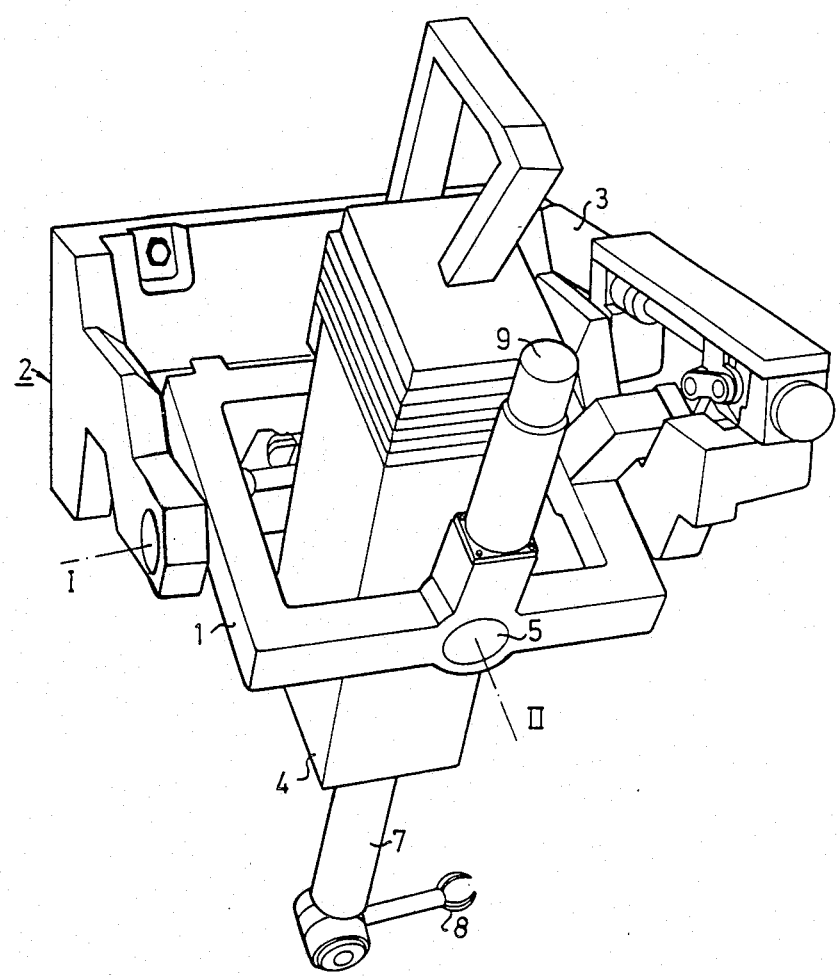
FIG. 1 illustrates therewith a schematic perspective view of an industrial robot provided with an arrangement according to the invention.

The perspective view shown in FIG. 1 illustrates somewhat schematically an industrial robot incorporating a gimbal-ring type or universal suspension, in which a first swinging axis I is provided by mounting a frame 1 for swinging motion in trunnions or journal means in a carrier arrangement 2, this swinging motion being effected by a motor 3 mounted on the carrier 2. This forms no part of the invention. Arranged in the frame is a machine part 4 which can be swung on trunnions or journal pins 5 and 6, of which only the end cover of one end of one journal means 5 is visible in the figure. A motor 9 intended for translatory movement of the movable part 7 in the machine part 4 is attached to the frame 1.

Swinging motion can be effected in accordance with the swinging axes I and II respectively, by means of the motor 3 and a further motor hidden from view in the perspective illustration of FIG. 1. Since this forms no part of the invention, its function will not be described in detail here. The manner in which translatory movement of the movable unit 7 is achieved will be made apparent hereinafter. On the extremity of the unit 7 there is seated a further swingable joint and finally in this case a gripping device 8, although the robot may, in the main, be fitted with any type of tool whatsoever. This further device also forms no part of the invention as such and will not be dwelt upon in this description.

Figure 2:
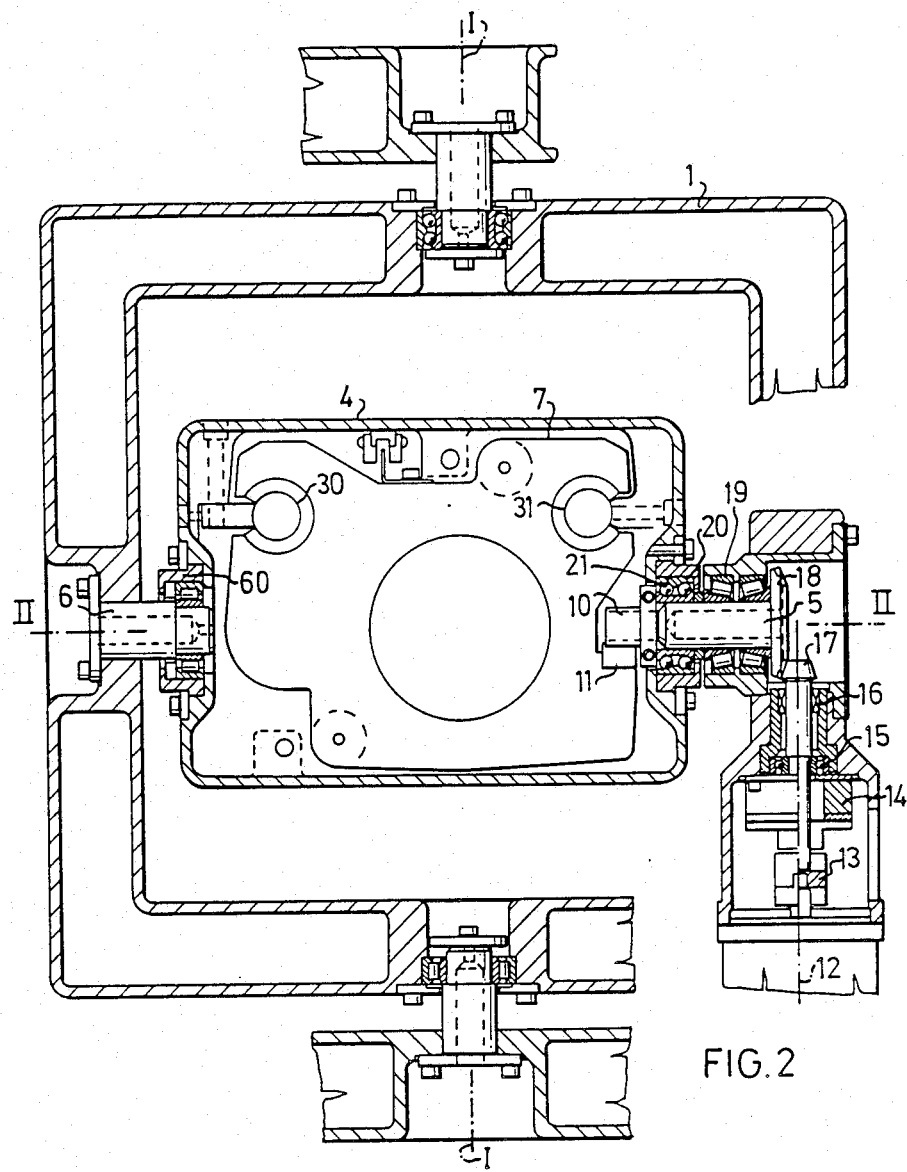
FIG. 2 is a schematic plan view illustrating the invention.

Subsequent to this account of the environment of the invention, a better understanding of the invention can be had from FIG. 2, which is a sectional view through the same robot through the centralized swinging axes I and II. It will be seen that the machine part 4 can be swung in two mutually perpendicular directions. The motor 9, which in FIG. 1 is shown with its axis at right angles to the frame 1, has only been indicated in FIG. 2 with its axis 12 for practical purposes swung to the plane of the paper, which does not therefore conform to the true embodiment illustrated in FIG. 1. Only a part of the frame 1 is shown for the same reason.

As shown in FIG. 2, the machine part 4 is journalled in the frame 1 on two trunnions or journal means 5 and 6. The machine part 4 can be caused to swing in the frame 1 with the aid of a separate motor, in a manner not shown. The journal means 6 is firmly mounted in the frame 1 and journalled in the machine part 4, while the journal means 5 on the other hand is journalled in both the frame 1 through the bearing 19, and the machine part 4, through the bearing 21. This enables the journal means 5 to be rotated individually without affecting the position or movement relative to the machine part 4 in relation to the swinging axis II. The journal means 5 can be rotated by means of the motor 9 (FIG. 1) via an elastic coupling 13, a brake 14 firmly mounted on the shaft, and a bevel gearing comprising the gear 17 on the shaft 12 and the gear 18 on the journal means 5. The motor is combined with a resolver of known kind in a manner not shown to enable the rotation to be controlled.

On the inside of the box-like structure which forms the outer part of the machine part 4 and in which the journal means 5 is journalled by means of the ball bearing 21, the journal means 5 is provided with a pinion 10 which meshes with a rack 11 mounted on a translatorily movable unit 7 in the machine part 4. This movable unit is mounted on guides 30,31 which are firmly secured within the box-like structure forming the outer part of the machine part 4. The part of the movable unit 7 illustrated in FIG. 2 forms, in the main a type of platform which is connected to an outwardly projecting rod identified by the same reference 7 in FIG. 1. Other devices, such as devices for rotating the outwardly projecting part of the member 7 according to FIG. 1 can be mounted on this slidable platform, which can thus slide on the guides 30 and 31. This forms no part of the invention, however, and will not therefore be discussed further.

When the motor 9 (FIG. 1) now rotates the shaft 12, the gear 17 will rotate and drive the gear 18, therewith rotating the journal means 5, the pinion 10 meshing with the rack 11, which is activated so as to move the movable unit 7 along the guides 30 and 31.

The arrangement according to the invention employs only two gear meshes, which is a considerable improvement over prior art techniques. The play in these gear meshes can also be reduced to a minimum, there being chosen gear forms which will function well even at other centre distances than the nominal distances, e.g. evolute gear forms. The bevel gearing 17,18 can then be adjusted with an arrangement of suitable shims, wherewith the bevel gear 18 can be placed at an adjustable distance from the centre axis to the bevel gear 17. With regard to the engagement between the rack 11 and the pinion 10, the rack must be parallel with the guide support bearing against the guides 30 and 31. It must also be possible to adjust the distance between the pinion 10 and the rack 11, and it must be possible to count upon reliable minimum play at all times.

Figure 3:
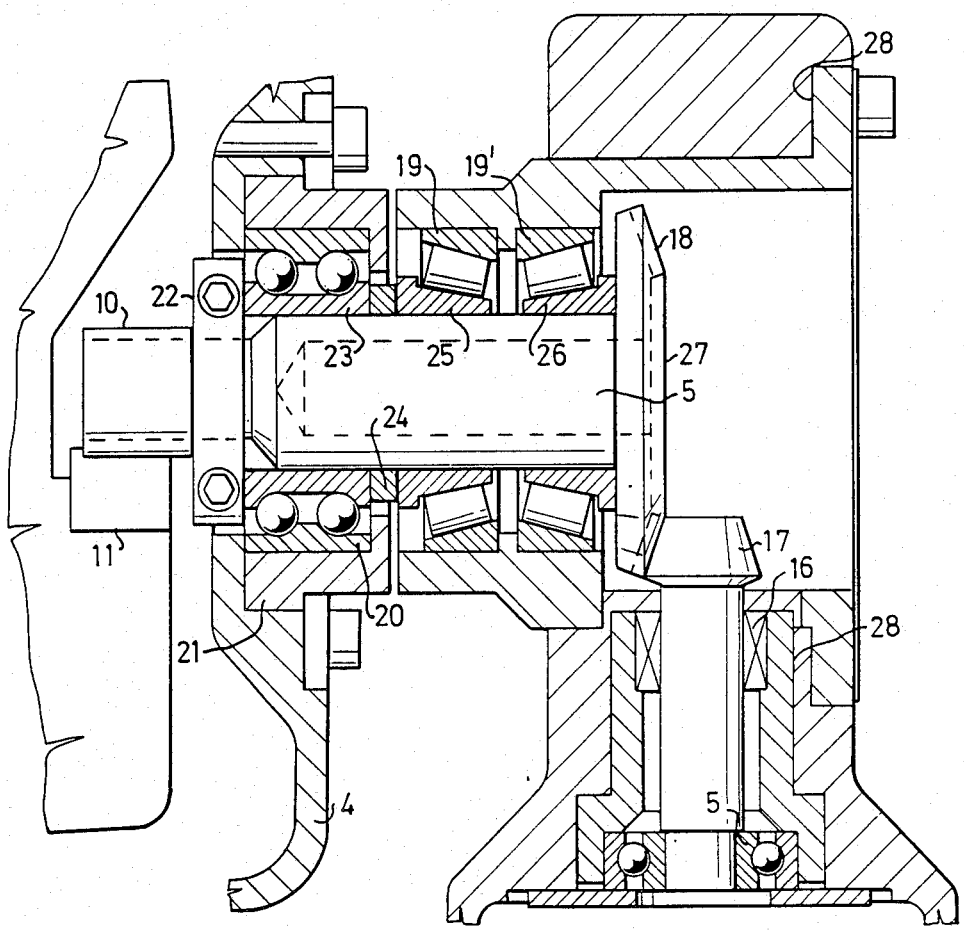
FIG. 3 is an enlarged detail view.

A detail view of a construction which fulfills high requirements in this respect is shown in FIG. 3.

Figure 4:
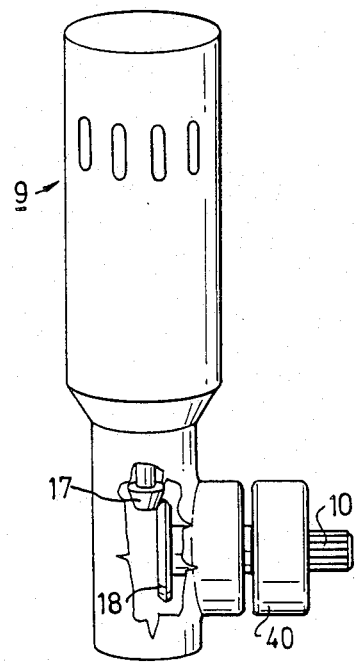
FIG. 4 illustrates an arrangement in which journal means and motor unit are coupled together to form an assembly.

It will be noted initially that the two roller bearings 19,19' can be adjusted to minimum play through the agency of a two-part split ring 22 mounted on the journal means 5 and held together by a screw joint. The ring 22 abuts the inner ring 23 of the ball bearing 20, which ring in turn bears against the inner ring 25 of the one roller bearing 19 via an intermediate ring 24. Located in the flange on the journal means 5 in which the gear 18 is cut are three axially directed screws 27, of which only one is shown, which screws when screwed in press the inner bearing ring 26 of the outer roller bearing 19' in towards the first mentioned inner bearing ring 25. The roller bearings 19,19' can be tightened to a desired degree of tightness by creating a tensile force in the journal means 5, or to given tightness by inserting an intermediate ring (not shown) therebetween. The axial position of the gear 18 in relation to the gear 17 can then be adjusted with the aid of shims, e.g. at 28. In a preferred embodiment illustrated schematically in FIG. 4 the motor with bevelled gearing 17,18 and the journal means 5 with applied bearings 19,20 are combined to form a separate assembly, which can be mounted, dismantled, changed etc. as a separate component. The outer bearing ring of the ball bearing 21 is then mounted in an eccentric ring 21, not shown in FIG. 4, which when rotated enables adjustment of the distance between the pinion 10 and the rack 11 on one side. A corresponding eccentric arrangement in respect of the bearing 60 of the journal means 6 enables the pinion 10 to be brought parallel with the tooth direction of the rack 11. Such an assembly can thus be adjusted on a bench prior to being mounted in the frame 1, which is provided with conforming recesses and suitably screw-threaded mounting holes for bolting the assembly to the frame.

The invention affords a particularly useful solution to the problem intended to be solved by the invention, enabling for example in an industrial robot assembly according to FIG. 1 an accuracy in adjustment of about 0.2 mm in the case of a robot having a stroke length of about one meter.

I claim:

1. An arrangement for an industrial robot of the type which has two mutually perpendicular swinging axes arranged in accordance with the gimbal-ring type principle, the arrangement comprising a carrier, a frame which is swingably journalled by first journal means on each side of the carrier to provide a first swinging movement about a first swinging axis, a machine part being journalled by two second journal means in the frame for swinging motion about a second swinging axis extending at right angles to the first swinging axis, said machine part supporting a movable unit which is mounted for translatory movement at right angles in relation to the second swinging axis and on which a working device can be mounted, a first motor to provide for said first swinging movement and a second motor to provide for said second swinging movement, and drive means to transfer power from a third motor for moving the movable unit in the gimbal-type movable machine part, the third motor being mounted on the aforesaid swingably journalled frame and connected to one of the second journal means in which the machine part is journalled, said one of the second journal means being journalled for rotation both to the frame and the machine part, and the drive means including, adjacent the machine part, a pinion rotatable by the third motor, and a rack secured to the movable unit of the machine part which meshes with the pinion and which extends parallel with the direction of movement of said movable unit.

2. An arrangement according to claim 1, wherein the one of the second journal means is provided on one end thereof with said pinion and on its other end with a first bevelled gear and the third motor is connected directly by a shaft to a second bevelled gear which meshes with the first bevelled gear.

3. An arrangement according to claim 1, wherein the machine part includes a bearing in an outer ring coaxial with the journal means and conforming to a cylindrical inner surface of an adjustment means in the machine part; and the cylindrical outer surface of the outer ring has a centre line which is parallel with said cylindrical inner surface but slightly offset, the outer ring being rotatably arranged and fixable in the machine part so as to enable the pinion to be adjusted in its position relative to the rack.

* * * * *